(12) United States Patent
Wehrenberg

(10) Patent No.: US 7,585,016 B2
(45) Date of Patent: Sep. 8, 2009

(54) CONSTRUCTION MACHINE HAVING TOP DOOR FOR IMPROVED INGRESS/EGRESS

(75) Inventor: Todd M Wehrenberg, Dubuque, IA (US)

(73) Assignee: Deere & Company, Moline, IL (US)

( * ) Notice: Subject to any disclaimer, the term of this patent is extended or adjusted under 35 U.S.C. 154(b) by 49 days.

(21) Appl. No.: 11/479,810

(22) Filed: Jun. 30, 2006

(65) Prior Publication Data
US 2008/0001440 A1 Jan. 3, 2008

(51) Int. Cl.
*B62D 33/06* (2006.01)
*B60J 5/02* (2006.01)

(52) U.S. Cl. ............... 296/190.11; 296/216.02; 296/190.1; 49/38; 160/187

(58) Field of Classification Search ............ 296/216.02, 296/190.08, 190.11, 100.09, 146.8, 190.1; 49/38, 168, 40, 470; 180/69.24; 160/180, 160/187
See application file for complete search history.

(56) References Cited

U.S. PATENT DOCUMENTS

| | | | | |
|---|---|---|---|---|
| 1,704,420 A | * | 3/1929 | Bailey | 49/257 |
| 1,707,064 A | * | 3/1929 | Martin et al. | 49/463 |
| 1,902,545 A | * | 3/1933 | Ditchfield | 160/203 |
| 2,086,091 A | * | 7/1937 | Payette | 296/100.09 |
| 2,795,458 A | * | 6/1957 | Wieschel | 296/102 |
| 2,815,243 A | * | 12/1957 | Campbell | 296/190.11 |
| 2,973,221 A | * | 2/1961 | Blackman | 296/146.4 |
| 3,713,472 A | * | 1/1973 | Dozois | 160/189 |
| 3,716,945 A | * | 2/1973 | Cooper et al. | 49/139 |
| 4,119,340 A | * | 10/1978 | Wolfe | 296/215 |
| 4,275,800 A | * | 6/1981 | Batzel | 180/317 |
| 5,054,846 A | * | 10/1991 | Simin et al. | 296/218 |
| 5,613,728 A | * | 3/1997 | Smith et al. | 296/219 |
| 6,382,711 B2 | * | 5/2002 | Martin, Jr. | 296/190.08 |
| 7,222,691 B2 | * | 5/2007 | Menebroker et al. | 180/286 |

OTHER PUBLICATIONS

John Deere, 300 Series Skid Steers, Commercial Worksite Products, pp. 1-21, USA.

* cited by examiner

*Primary Examiner*—Dennis H Pedder
(74) *Attorney, Agent, or Firm*—Baker & Daniels LLP

(57) ABSTRACT

A construction machine having a flip roof top to provide space for improved ingress into and egress from the cab of the construction machine. The construction machine includes a chassis, a construction tool coupled to the chassis, and a cab mounted on the chassis. The cab has a frame that supports a back panel, a pair of opposing side panels, a front door panel and a roof panel. The back, side and front door panels cooperate to define an interior cab space. Operator controls are disposed in the interior cab space and are operatively coupled to the construction tool. The roof panel has opposing first and second edges. The first edge is pivotally coupled to the frame. The roof panel is pivotal between a closed position, wherein the second edge is proximal the frame, and an open position wherein the second edge is pivoted upward away from the frame.

26 Claims, 5 Drawing Sheets

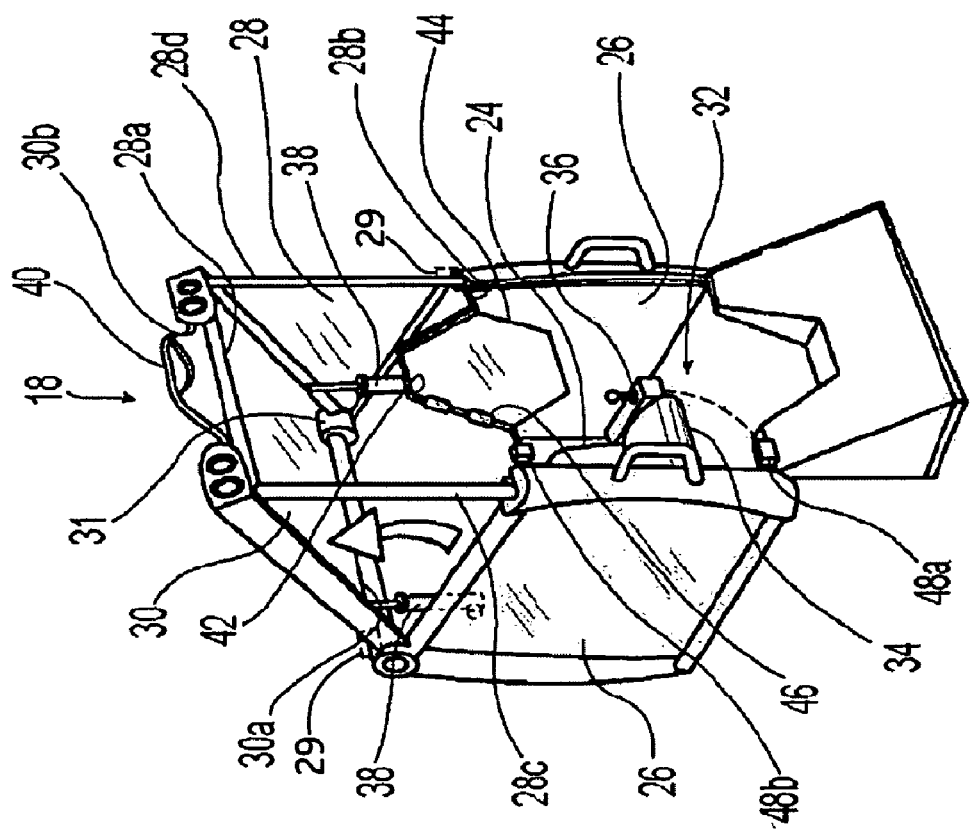
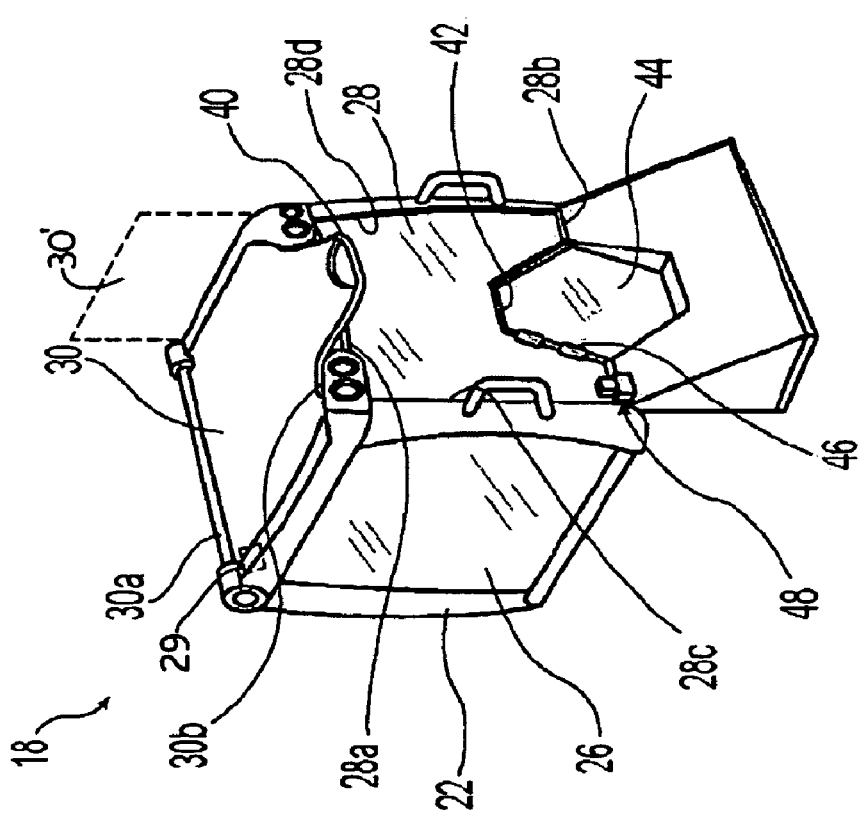
Fig. 2A
Fig. 2B

CONSTRUCTION MACHINE HAVING TOP DOOR FOR IMPROVED INGRESS/EGRESS

BACKGROUND

The present invention relates to construction machines, such as skid steers and compact loaders, and, more particularly, to mechanisms for gaining access to the cab of such construction machines.

Construction machines or vehicles, such as skid steers and compact loaders, generally include a chassis and a traction device coupled to the chassis and adapted to move the chassis along the ground. The chassis supports a cab in which the operator sits and operates the construction machine. A construction tool, such as a bucket, forklift or grapple, is movably coupled to the chassis by lift arms, and is operated by the operator using controls located in the cab. The lift arms of many construction machines move alongside the cab and have major pivot points behind the operator. Due to the operator's proximity to the moving lift arms, pivot points and construction tools, fully enclosed cabs have been employed to protect the operator from injury.

In some construction machines, it is desirable to employ a compact cab having a small interior space, just large enough for the operator to sit and operate the controls. This is particularly applicable in the case of skid steers. Skid steers use a four-wheel drive traction device with left-side and right-side drive wheels, which are independent of one another. The independent drive wheels make the skid steer especially agile. By coupling this agility with a compact overall size, skid steers can operate in areas that are otherwise off limits to larger equipment. Accordingly, such skid steers have a compact cab having a pivoting front door panel, which provides a front door opening through which the operator may enter and exit the small interior space. Due to the small interior space of such cabs, the operator must duck down and virtually crawl through the front door opening and into the interior space of the cabin. In addition, the small interior space of such cabs do not permit the operator to stand up inside the cab. Accordingly, if the operator wants to survey the ground in the area of the construction tool, he must exit the cab.

It would be beneficial to provide a construction machine or vehicle having an improved mechanism for entering and exiting the cab, such that the operator could more comfortably and easily enter and exit the cab. It would be of further benefit if such mechanism also allowed the operator to stand up and survey the work area without having to exit the cab.

SUMMARY

The present invention provides a construction machine having a flip roof top to provide additional space for ingress into and egress from the cab of the construction machine. In one form, the construction machine includes a chassis, a construction tool coupled to the chassis, and a cab mounted on the chassis. The cab has a frame that supports a back panel, a pair of opposing side panels, a front door panel and a roof panel. The back, side and front door panels cooperate to define an interior cab space. The cab includes operator controls, which are disposed in the interior cab space and are operatively coupled to the construction tool. The roof panel has a first edge and a second edge opposite the first edge. The first edge is pivotally coupled to the frame proximal the back panel. The roof panel is pivotal between a closed position, wherein the second edge is proximal the frame, and an open position wherein the second edge is pivoted upward away from the frame and toward the back panel.

In another form, the present invention provides a construction vehicle including a chassis, a construction tool coupled to the chassis and a cab mounted on the chassis. The cab has a frame, which defines an interior cab space and supports a roof panel. The cab includes operator controls disposed in the interior cab space and operatively coupled to the construction tool. The roof panel has a first edge and a second edge opposite the first edge. The first edge is pivotally coupled to the frame such that the roof panel is pivotal between a closed position and an open position, wherein when the roof panel is in the open position, the roof panel is pivoted upward away from the interior cab space to provide access to the interior cab space.

In yet another form, the construction vehicle includes a chassis, a construction tool coupled to the chassis and a cab mounted on the chassis. The cab has a frame defining an interior cab space and supporting a back panel, a pair of opposing side panels, a front door panel and a roof panel. The cab includes operator controls disposed in the interior cab space and operatively coupled to the construction tool. The roof panel has a first edge and a second edge opposite the first edge. The first edge is pivotally coupled to the frame proximal the back panel. The roof panel is pivotal between a closed position and an open position. The front door panel has an upper edge and an opposing lower edge. The upper edge is pivotally coupled to the second edge of the roof panel. When the roof panel is in the open position, the second edge is pivoted upward away from the interior cab space and the front door panel is raised therewith in a direction away from the frame. When the roof panel is in the closed position, the second edge of the roof panel is proximal to and extends between the pair of side panels.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 2A is a perspective view of the cab of the skid steer of FIG. 1, wherein the roof panel and front door panel are in a closed position;

FIG. 2B is a perspective view of the cab of FIG. 2A, wherein the roof panel and front door panel are in an open position;

Figure 1:
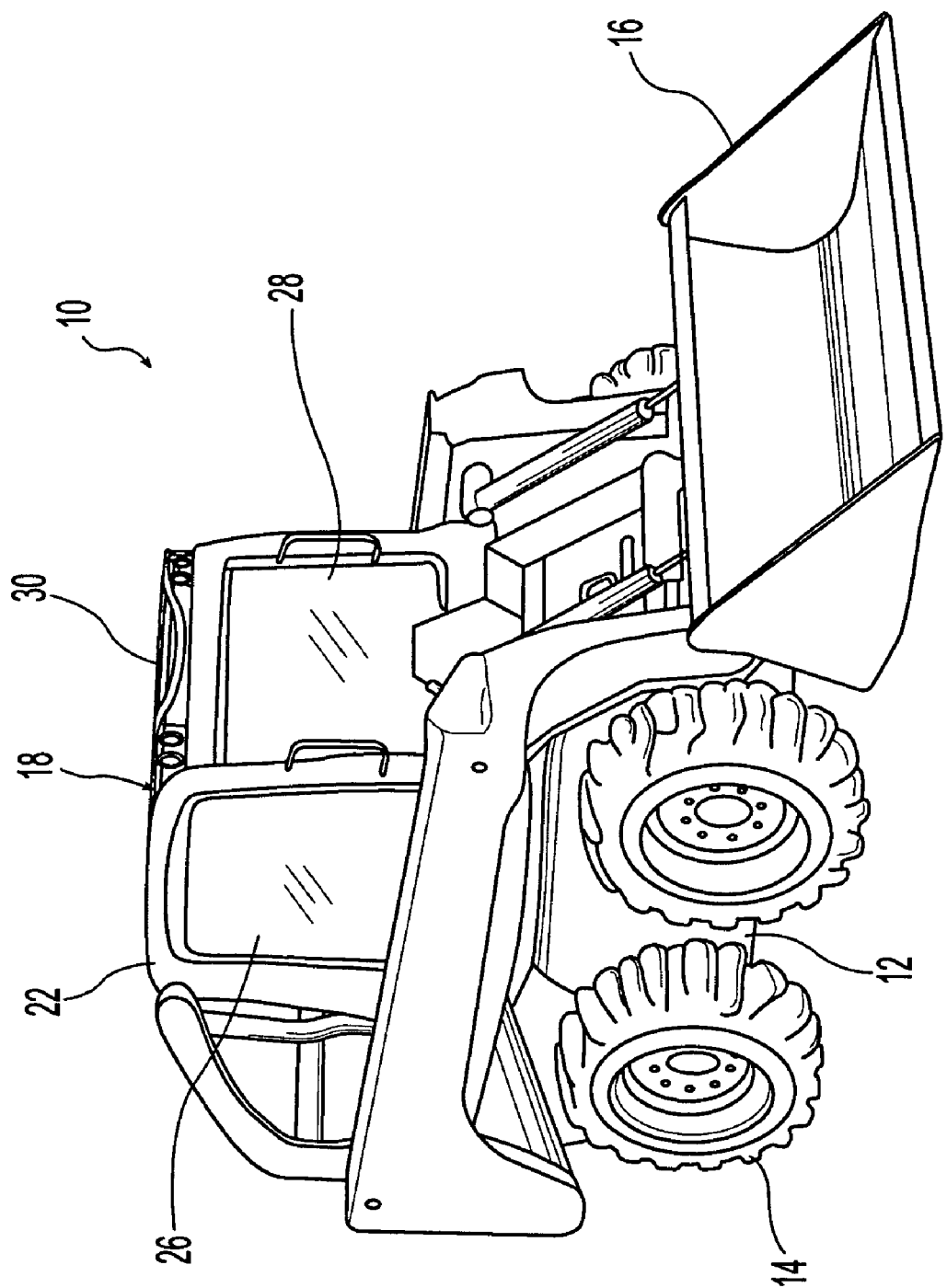
FIG. 1 is a perspective view of a skid steer construction machine according to one embodiment of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

Referring first to FIG. 1, construction machine 10 according to one embodiment of the present invention is illustrated. Construction machine 10 is illustrated as a skid steer. However, it should be understood that the concepts described herein may be adapted for incorporation into any suitable construction, agricultural and forestry equipment including, for example, compact track loaders, backhoes, dozers and other equipment. Skid steer 10 generally includes chassis 12, traction device 14 coupled to chassis 12, construction tool or attachment 16 coupled to chassis 12 and cab 18 supported on chassis 12. Traction device 14 is illustrated as a set of wheels, but may be any device capable of moving chassis 12 relative to the ground. For instance, traction device 14 may be in the form of a track drive. Construction tool attachment 16 is operatively coupled to chassis 12 and is adapted to perform work such as digging, scraping, excavating or hauling. As illustrated in FIG. 1, tool attachment 16 may be in the form of a bucket. Alternatively, the tool attachment may be in the form of any known tool, such as a broom, auger, grapple or forklift.

Turning now to FIGS. 1 and 2A-2C, cab 18 includes frame 22 supported on chassis 12. Cab 18 further includes back panel 24, pair of opposing side panels 26, front door panel 28 and top roof panel 30, each of which is supported on frame 22. Each of back panel 24, side panel 26, front door panel 28 and roof panel 30 is illustrated as being formed of a solid material, such as glass or plastic, but may be formed of any material including a mesh or caging material. Although not necessary, it may be desirable to form one or more of panels 24, 26 and 30 from a material through which an operator can see.

Figure 2C:
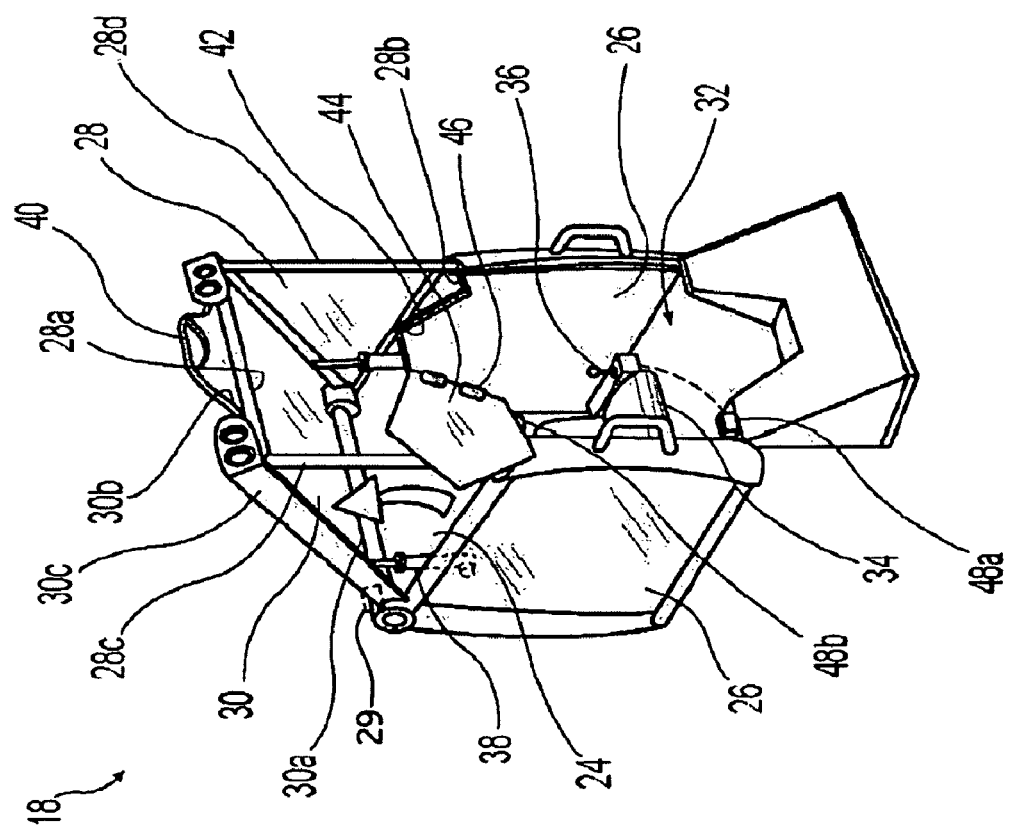
FIG. 2C is a perspective view of the cab of FIG. 2B, wherein the flap of the front door panel is in an open position.
Figure 2D:
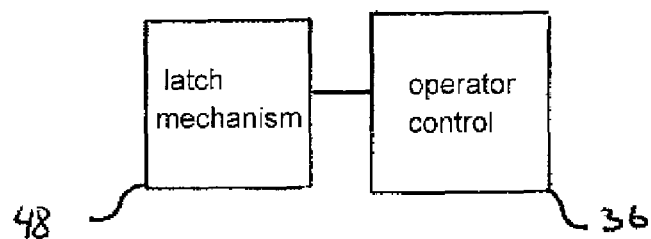
FIG. 2D is a schematic description of latch mechanism coupled to operator control.
Figure 2E:
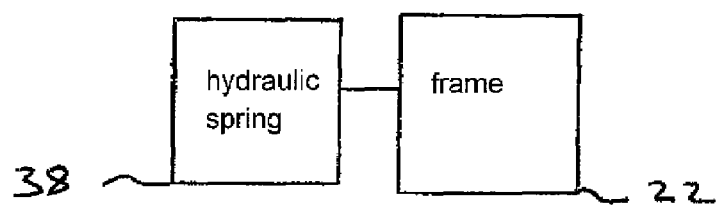
FIG. 2E is a schematic description of hydraulic spring is coupled to frame.
Figure 2F:
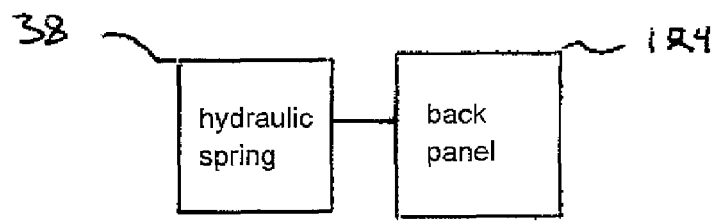
FIG. 2F is a schematic description of hydraulic spring is coupled to back panel.
Figure 2G:
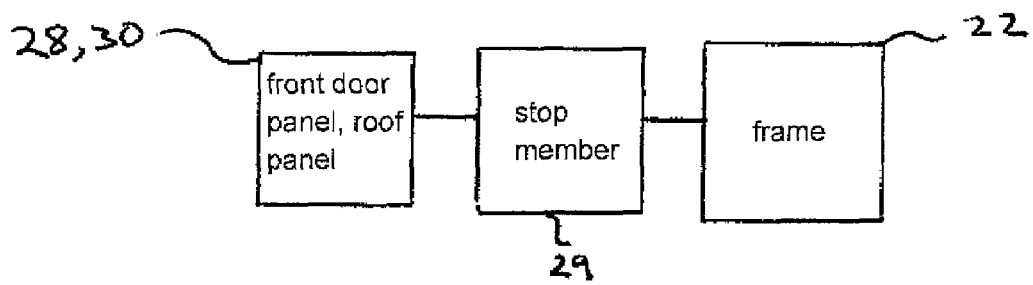
FIG. 2G is a schematic description of stop member coupled to one of front door panel and roof panel and also coupled to frame.

Referring particularly to FIGS. 2A-2C, back panel 24, side panels 26, front door panel 28 and roof panel 30 cooperate to form interior space 32. Seat 34 is disposed in interior space 32 along with operator controls 36, which are operatively coupled to traction device 14 and/or tool attachment 16. Top roof panel 30 includes first front edge 30a and opposing second back edge 30b. First edge 30a is pivotally coupled to frame 22 proximal back panel 24 by hinge mechanism 31. Hinge mechanism 31 may be any suitable hinge device including, for example, a continuous hinge, spring hinge, pin and barrel hinge, bearing hinge and knuckle hinge. Furthermore, hinge mechanism 31 need not be a discrete component but rather may be formed from integral parts of roof panel 30 and frame 22. As described in further detail below, roof panel 30 is pivotable between a closed position, shown in FIG. 2A and an open position shown in FIGS. 2B and 2C. Optional hydraulic springs 38 may be coupled at one end to roof panel 30 and at the opposite end to side panels 26 of frame 22 and are adapted to hold roof panel 30 in an open position, as is discussed in further detail below. Hydraulic springs 38 may be placed in alternative positions and coupled to alternative components. Roof panel 30 includes handle 40 protruding from second edge 30b.

Referring still to FIGS. 2A-2C, front door panel 28 includes upper edge 28a, opposing lower edge 28b, and opposing side edges 28c and 28d. Front door panel 28 is pivotally coupled to second edge 30b of roof panel 30 by a hinge mechanism (not shown). The hinge mechanism (not shown) coupling upper edge 28a to second edge 30b may be of any type, such as those described above with respect to hinge mechanism 31. Lower edge 28b of front door panel 28 includes cut-out 42 extending upwardly toward upper edge 28a. Flap 44 is hingedly connected by hinges 46 to lower edge 28b at cut-out 42 and is configured to fit within and cover cut-out 42. Hinges 46 may be any known hinge mechanism, such as those discussed above with respect to hinge mechanism 31. Flap 44 is pivotable between a closed position, shown in FIGS. 2A and 2B, and an open position shown in FIG. 2C.

Referring still to FIGS. 2A-2C, cab 18 also includes latch mechanism 48 adapted to releasably latch lower edge 28b of front door panel 28 to frame 22. Latch mechanism 48 includes a first latch component 48a coupled to frame 22 and second latch component 48b coupled to front door panel 28. First latch component 48a is configured to engage with second latch component 48b to lock front door panel 28 and roof panel 30 in the closed position of FIG. 2A, as discussed in further detail below. Latch mechanism 48 may be any known latch mechanism capable of locking one object to another. As described in further detail below, it may be desirable to employ a quick release latch mechanism that may be activated by a user's foot.

Referring to FIGS. 2A-2C, operation of cab 18 will now be described. A user operates skid steer 10 (FIG. 1) from seat 34 using operator controls 36. Accordingly, the user must be able to enter and exit interior space 32, in which seat 34 and operator controls 36 are located. To gain entry access to interior space 32, the user engages/activates latch mechanism 48, thereby disengaging first latch component 48b from second latch component 48a and allowing roof panel 30 and front door panel 28 to move relative to frame 22. Once latch 48 is released, hydraulic springs 38 urge roof panel 30 to pivot from the closed position of FIG. 2A to the open position of FIGS. 2B and 2C. More particularly, roof panel 30 pivots at first edge 30a such that second edge 30b moves upward and away from interior space 32. As roof panel 30 pivots to the open position, roof panel 30 via its hinged coupling to front door panel 28 draws front panel 28 upward. The user can then enter interior space 32 of cab 18 from the front area of cab 18 where front door panel 28 was formerly located.

Additional head room to ease the user's entry into interior space 32 may be provided by pivoting flap 44 from the closed position shown in FIGS. 2A and 2B, to the open position shown in FIG. 2C. When flap 44 is in the open position, cut-out 42 provides additional space for user to enter cab 18. Once inside cab 18, the user moves flap 44 to the closed position of FIGS. 2A and 2B. Then, the user moves roof panel 30 and front door panel to the closed position of FIG. 2A by grasping a handle (not shown) on the interior side of either front door panel 28 or roof panel 30 and pulling roof panel 30 and front door panel 28 down to the closed position. Latch component 48b then engages latch component 48a to lock roof panel 30 and front door panel 28 in the closed position. Latch component 48 may be adapted such that latch component 48a automatically engages latch component 48b in a locked arrangement. Alternatively, latch component 48 may be adapted such that the user must manually lock latch component 48a to latch component 48b.

Referring still to FIGS. 2A-2C, to exit cab 18, the user activates latch mechanism 48 causing latch component 48b to disengage latch component 48a. Roof panel 30 and front door panel 28 are urged upward away from frame 22 by hydraulic springs 38. Flap 44 is pivoted open and user exits cab 18. Once outside of cab 18, the user may close flap 44, and then close door panel 28 and roof panel 30 by grasping handle 40 and pulling down until latch component 48b lockingly engages latch component 48a.

The present invention further contemplates a safety mechanism to help prevent injury. For instance, latch mechanism 48 may be operatively coupled to operator controls 36 such that operator controls 36 are disabled when latch component 48a is disengaged from latch component 48b. In this configuration, the user is prevented from operating traction device 14 and/or tool attachment 16 unless latch mechanism 48 has effectively locked roof panel 30 and front door panel 28 in the closed position. It should be understood that latch mechanism 48 may be positioned at alternative locations on cab 18. For instance, latch component 48b may be positioned on side 30c of roof panel, while latch component 48a may be located on side panel 26 or on frame 22 proximal side panel 26.

As demonstrated above, cab 18 provides for greater space through which a user may enter or exit cab 18. In addition, cab 18 provides additional headroom allowing the user to stand up inside cab 18. This permits the user to pause work, stand up and survey the area of work by looking through raised front door panel 28 and/or flap 44.

Figure 3:
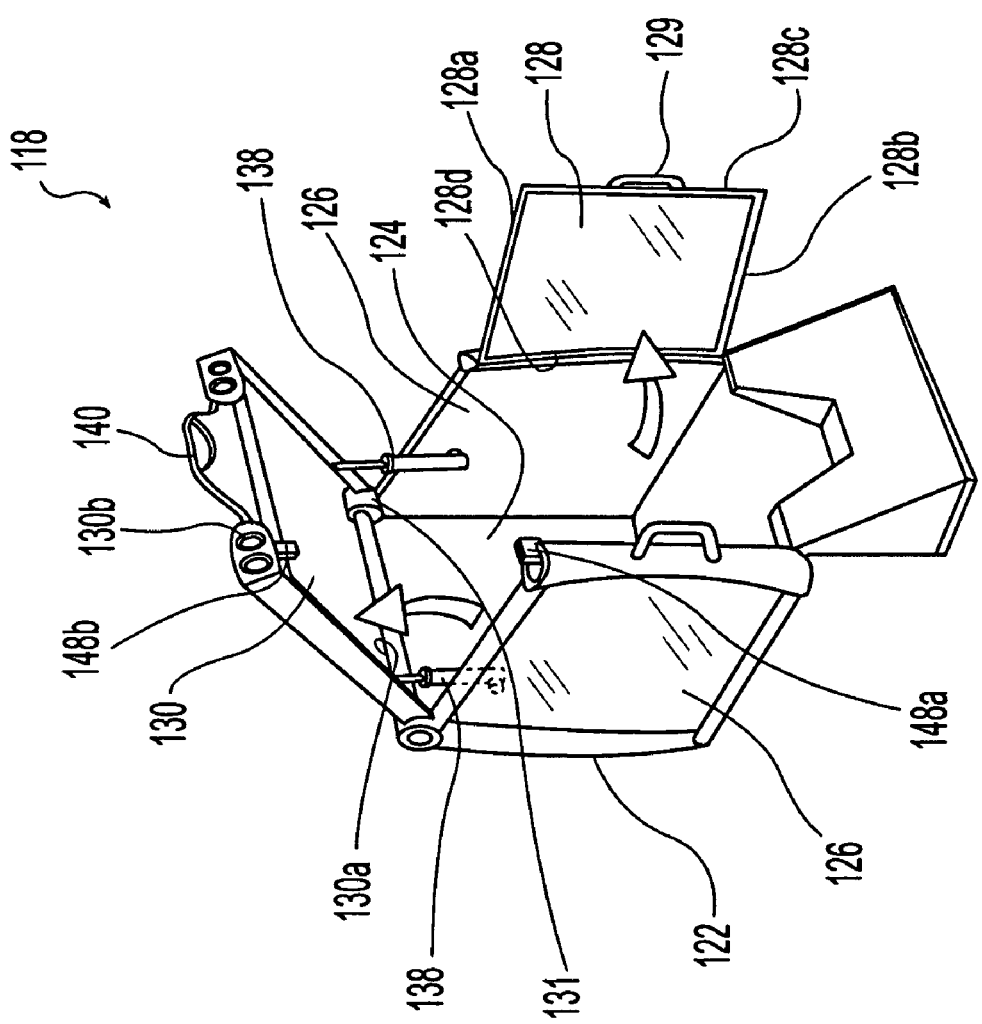
FIG. 3 is a perspective view of a cab of a construction machine according to another embodiment of the present invention.

Referring now to FIG. 3, the front door to the cab need not be coupled to and move with the roof panel. As illustrated in FIG. 3, cab 118 includes frame 122, which supports back panel 124, side panels 126, front door panel 128 and roof panel 130. Roof panel 130 includes first edge 130a pivotally coupled to frame 122 by hinge mechanism and opposing second edge 130b. Roof panel 130 is adapted to pivot at first edge 130a from a closed position (not shown) to an open position, shown in FIG. 3. Roof panel 130 also includes handle 140. Hydraulic springs 138 are coupled at one end to roof panel 130 and at the opposite end to side panel 126. Hydraulic spring 138 is adapted to hold roof panel 130 in the open position. Latch mechanism includes first latch component 148a coupled to frame 122 and second latch component 148b coupled to roof panel 30. Latch components 148a, 148b are adapted to releasably engage with one another as described with respect to latch mechanism 48 (FIG. 2A).

Front door panel 128 includes opposing upper and lower edges 128a, 128b and opposing side edges 128c, 128d. Side edge 128d is pivotably coupled to either frame 122 proximal side panel 126 or side panel 126. Front door panel 128 is pivotable between a closed position (not shown) to an open position, shown in FIG. 3. Front door panel 128 includes handle 129.

To enter cab 118, the user pivots front door panel 128 to the open position shown in FIG. 3. Then, the user activates the latch mechanism, disengaging first latch component 148a from second latch component 148b. Roof panel 130 is then urged upward by hydraulic springs 138 to the open position shown in FIG. 3. The user, then, may enter cab 18.

The embodiments described above illustrate the roof panel as pivoting at the back edge such that the front edge moves upward and away from the frame. However, it should be understood that in the embodiment of FIG. 3, the roof panel may be adapted to pivot at one side such that the opposite side moves upward away from the frame.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A construction machine comprising:
a chassis,
a construction tool coupled to said chassis; and
a cab mounted on said chassis and having a frame, said frame supporting a back panel, a pair of opposing side panels, a front door panel and a roof panel, said back, side and front door panels cooperating to define an interior cab space, said cab including operator controls disposed in said interior cab space and operatively coupled to said construction tool, said roof panel having a first edge and a second edge opposite said first edge, said first edge being pivotally coupled to one of said back panel and said frame proximal said back panel, said roof panel being pivotal between a closed position, wherein said second edge is proximal said frame, and an open position wherein said second edge is pivoted upward away from said frame and toward said back panel, wherein said front door panel includes an upper edge and a lower edge, said upper edge is pivotally coupled to said second edge of said roof panel such that when said roof panel is in an open position said upper edge is urged upward and away from said frame, said lower edge slideably coupled to said frame when said roof panel is in said open position.

2. A construction machine comprising:
a chassis,
a construction tool coupled to said chassis; and
a cab mounted on said chassis and having a frame, said frame supporting a back panel, a pair of opposing side panels, a front door panel and a roof panel, said back, side and front door panels cooperating to define an interior cab space, said cab including operator controls disposed in said interior cab space and operatively coupled to said construction tool, said roof panel having a first edge and a second edge opposite said first edge, said first edge being pivotally coupled to one of said back panel and said frame proximal said back panel, said roof panel being pivotal between a closed position, wherein said second edge is proximal said frame, and an open position wherein said second edge is pivoted upward away from said frame and toward said back panel, wherein said front door panel includes an upper edge and a lower edge, said upper edge is pivotally coupled to said second edge of said roof panel such that when said roof panel is in an open position said upper edge is urged upward and away from said frame, wherein said lower edge of said front door panel includes a cut-out extending upwardly toward said upper edge, wherein said front door panel includes a flap hingedly coupled to said lower edge proximal said cut-out, said flap moveable between a first flap position covering said cut-out and a second flap position exposing said cut-out,
when said roof panel is in the open position, said pair of opposing side panels and said lower edge cooperate to define a vertical opening in communication with said interior cab space and having a height,
when said roof panel is in the open position, when in said second position, said flap increases the height of said vertical opening.

3. A construction vehicle comprising:
a chassis,
a construction tool coupled to said chassis; and a cab mounted on said chassis and having a frame, said frame defining an interior cab space and supporting a back panel, a pair of opposing side panels, a front door panel and a roof panel, said cab including operator controls disposed in said interior cab space and operatively coupled to said construction tool, said roof panel having a first edge and a second edge opposite said first edge, said first edge being pivotally coupled to said frame proximal said back panel, said roof panel being pivotal between a closed position and an open position, said front door panel having an upper edge and an opposing lower edge, said upper edge being pivotally coupled to said second edge of said roof panel, wherein when said roof panel is in said open position, said second edge is pivoted upward away from said interior cab space and said front door panel is raised therewith in a direction away from said frame, wherein said open position defines an opening, said front door panel being substantially parallel to said opening, and wherein, when said roof panel is in said closed position, said second edge of said roof panel is proximal to and extending between said pair of side panels.

4. A compact construction vehicle comprising:
a chassis,
a construction tool coupled to the chassis; and
a cab mounted on said chassis and having a frame, said frame defining an interior cab space and supporting a roof and a front door moveable between open and closed positions to permit ingress and egress to said interior cab space, said cab including operator controls disposed in said interior cab space and operatively coupled to said construction tool, said roof being moveable between a lowered position and a raised position, said door being coupled to said roof to move between said open and closed positions during movement of the roof between the raised and lowered positions, said front door having an upper edge and an opposing lower edge,
wherein said door includes a door panel and a flap hingedly coupled to said door panel, said flap is pivotable between a flap closed position and a flap open position, said flap open position provides additional headroom to access said interior cab space, wherein said flap defines a flap width that is substantially less than the width of said door, said flap extends below said opposing lower edge of the front door.

5. The construction machine of claim 1 wherein said cab further includes at least one hydraulic spring coupling said roof panel to said frame.

6. The construction machine of claim 1 wherein said roof panel further comprises a handle.

7. The construction machine of claim 1 wherein said cab further comprises a latch mechanism coupled to said roof panel and switchable between a locked condition, wherein said latch mechanism locks said roof panel in said closed position, and a released condition, wherein said roof panel in free to pivot between said open and closed positions.

8. The construction machine of claim 7 wherein said latch mechanism is coupled to said operator controls and is operative to disable said operator controls when said latch mechanism is in said released condition.

9. The construction machine of claim 3 further comprising a latch mechanism coupled to said operator controls and operable to disable said operator controls when said latch mechanism is in a released condition.

10. The construction vehicle of claim 9 wherein said cab further includes at least one hydraulic spring coupling said roof panel to either one of said frame, one of said side panels and said back panel.

11. The construction vehicle of claim 10 wherein the at least one hydraulic spring biases said roof panel to said open position.

12. The construction vehicle of claim 11 wherein said latch mechanism is coupled to said roof panel and switchable between a locked condition, wherein said latch mechanism locks said roof panel in said closed position, and said released condition, wherein said roof panel is free to pivot between said open and closed positions.

13. The construction machine of claim 1 wherein said lower edge of said front door panel includes a cut-out extending upwardly toward said upper edge.

14. The construction vehicle of claim 3 further comprising a stop member coupled to one of said roof panel and said front door panel, said stop member engaging said frame to limit the pivoting movement of said roof panel.

15. The construction machine of claim 1, wherein said front door panel provides
a single passenger ingress located between said construction tool and said cab.

16. The construction machine of claim 15, further comprising loading arms supporting said construction tool, wherein said cab includes opposing sides located between said loading arms.

17. The compact construction vehicle of claim 4, wherein said door panel defines a cut-out, wherein said flap is configured to fit within and cover said cut-out.

18. The construction vehicle of claim 17, wherein said cut-out provides additional headroom to access said interior cab space.

19. The compact construction vehicle of claim 4, further comprising a flap pivot for pivoting said flap, wherein the flap pivot is not horizontal.

20. The compact construction vehicle of claim 4, wherein said front door is coupled to said roof when said front door and said roof are in said open position.

21. The construction machine of claim 1, wherein said first edge is directly above said back panel.

22. The construction machine of claim 1, wherein said front door panel includes at least one side edge.

23. The construction machine of claim 22, wherein at least a portion of said at least one side edge engages said frame when said roof panel is in an open position.

24. The construction machine of claim 4, wherein said frame defines a frame cut-out.

25. The construction machine of claim 24, wherein said flap is configured to fit within and cover said frame cut-out.

26. The construction machine of claim 17, wherein said lower edge of said door panel defines said cut-out.

* * * * *